United States Patent
Lin

(10) Patent No.: US 7,394,801 B2
(45) Date of Patent: Jul. 1, 2008

(54) CELL SEARCH METHOD SUITABLE FOR INITIAL CELL SEARCH AND TARGET CELL SEARCH

(75) Inventor: Che-Li Lin, Taipei (TW)

(73) Assignee: Qisda Corporation, Taoyuan County (TW)

(*) Notice: Subject to any disclaimer, the term of this patent is extended or adjusted under 35 U.S.C. 154(b) by 974 days.

(21) Appl. No.: 10/462,689

(22) Filed: Jun. 17, 2003

(65) Prior Publication Data

US 2004/0258041 A1   Dec. 23, 2004

(51) Int. Cl.
*H04J 3/06*   (2006.01)

(52) U.S. Cl. .................. 370/350; 370/503; 370/508; 370/509; 370/510; 370/511; 370/512; 370/513; 370/514; 370/335; 455/502; 455/522; 455/513; 375/147

(58) Field of Classification Search .......... 370/350, 370/503, 508, 509, 510, 511, 512, 513, 514, 370/335; 455/502, 522, 513

See application file for complete search history.

(56) References Cited

U.S. PATENT DOCUMENTS

| 6,343,086 | B1* | 1/2002 | Katz et al. ............. 370/489 |
| 6,370,130 | B1* | 4/2002 | Zhou et al. ............. 370/335 |
| 6,526,091 | B1* | 2/2003 | Nystrom et al. ......... 375/142 |
| 7,012,909 | B2* | 3/2006 | Tanno et al. ............ 370/335 |
| 7,130,293 | B2* | 10/2006 | Hanada et al. .......... 370/342 |
| 2001/0030995 | A1* | 10/2001 | Gesret et al. ........... 375/150 |
| 2002/0110185 | A1* | 8/2002 | Ohnishi ................. 375/150 |
| 2002/0154609 | A1* | 10/2002 | Saito et al. ............. 370/324 |
| 2003/0076801 | A1* | 4/2003 | Aikawa et al. .......... 370/336 |
| 2003/0095516 | A1* | 5/2003 | Ok et al. ................ 370/331 |
| 2003/0119444 | A1* | 6/2003 | Yamaguchi ............. 455/21 |
| 2003/0161416 | A1* | 8/2003 | Meyer et al. ........... 375/343 |
| 2003/0202564 | A1* | 10/2003 | Ho et al. ................ 375/147 |
| 2003/0223384 | A1* | 12/2003 | Sengupta et al. ....... 370/320 |
| 2004/0228393 | A1* | 11/2004 | Chen et al. ............. 375/150 |
| 2005/0221848 | A1* | 10/2005 | Chitrapu et al. ........ 455/502 |

* cited by examiner

*Primary Examiner*—Edan Orgad
*Assistant Examiner*—Wutchung Chu
(74) *Attorney, Agent, or Firm*—Winston Hsu

(57) ABSTRACT

A wireless device generates a peak profile for a primary synchronization channel (PSCH), and has a synchronization stage for performing code group identification and scrambling code identification. A first peak from the peak profile is chosen. The first peak has a first path position. The synchronization stage is handed the first path position to obtain a first code group number and a first code number associated with the first peak. A multi-path search window is then opened in the peak profile around the first path position. A second peak within the multi-path search window is selected, and a verification procedure is performed on this second peak to determine if the second peak has a code number that is identical to the first code number. The first code group number is assigned to the second peak if the code number of the second peak is identical to the first code number.

33 Claims, 12 Drawing Sheets

US 7,394,801 B2

CELL SEARCH METHOD SUITABLE FOR INITIAL CELL SEARCH AND TARGET CELL SEARCH

BACKGROUND OF INVENTION

1. Field of the Invention

The present invention relates to cellular wireless devices. More specifically, a method is disclosed for performing initial and target base station acquisition for a direct sequence code division multiple access (DS/CDMA) system.

2. Description of the Prior Art

Spread spectrum communication systems are becoming increasingly important in cellular networks. In particular, so-called third generation (3G) cellular standards have adopted direct sequence code division multiple access (DS/CDMA) as a communications standard.

To establish a network connection in a CDMA system, the user equipment (UE) must first perform a cell search procedure. The cell search procedure enables the UE to obtain timing and code synchronization for the downlink channel. Various methods are known in the prior art for performing a cell search procedure. Attention is drawn, for example, to the article "Cell Search in W-CDMA" by Yi-Pin Eric Wang and Tony Ottosson in Vol. 18, No. 8 (August 2000 edition) of *IEEE Journal on Selected Areas in Communications*, which is included herein by reference. Base station acquisition is also discussed in U.S. Pat. No. 6,363,060 to Sarkar; U.S. Pat. No. 5,930,366 to Jamal et al., and U.S. Pat. No. 6,226,315 to Sriram, all of which are included herein by reference.

A simple overview of cell searching is presented in the following. Please refer to FIG. 1. FIG. 1 is a block diagram of a downlink Common Control Channel (CCH) 10 in a DS/CDMA system. The CCH 10 is broken up into a series of frames 12. Each frame 12 contains fifteen slots 14. Each slot 14 holds ten symbols, each of 256 chips. Hence, each slot 14 is 2560 chips in length. Please refer to FIG. 2 in conjunction with FIG. 1. FIG. 2 is a block diagram of a slot 14 in the CCH 10. The first symbol 16 in each slot 14 holds a primary synchronization channel (PSCH) 16p and a secondary synchronization channel (SSCH) 16s. The remaining nine symbols 18 follow after the first symbol 16. The PSCH 16p and SSCH 16s are orthogonal to each other, and hence can be broadcast on top of each other. The PSCH 16p chip coding is the same for all base stations, and does not change. The SSCH 16s chip coding changes with every slot 14 according to a predefined pattern that repeats every frame 12. Please refer to FIG. 3. FIG. 3 is a block diagram of a common pilot channel (CPICH) 20 broadcast with the CCH 10. The coding used for the CPICH 20 is unique to the broadcasting base station. In a DS/CDMA system, a base station can use one of 512 different codes for the CPICH 20, which are broken into 64 code groups, each having 8 respective codes. The coding of the PSCH 16p is common across all base stations, and can thus be used for slot 14 synchronization. Although the coding of the SSCH 16s changes on a slot 14 by slot 14 basis, the sequence pattern of code change of the SSCH 16s is determined by the code group into which the code used for the CPICH 20 lies. That is, there are 64 code sequence patterns for the SSCH 16s to follow, each of which corresponds to a particular code group associated with the code used for the CPICH 20. By correlating the received CCH signal 10 with all possible SSCH 16s code sequences and identifying the maximum correlation value, it is possible to learn the code group of the CPICH 20, and to obtain frame 12 synchronization. This is due to the fact that the SSCH 16s changes according to a predefined sequence, the starting sequence of which is known and which is sent at the beginning of every frame 12, thus enabling frame synchronization. Once the code group of the CPICH 20 is learned, it is possible to obtain the primary scrambling code used by the cell by performing symbol-by-symbol correlation over the CPICH 20 with all eight of the codes in the code group identified for the CPICH 20. Once the primary scrambling code used by the base station has been identified, system and cell specific broadcast channel (BCH) information can be read.

Based upon the above, cell searching is thus typically broken into the three following steps:

Step 1: Slot synchronization.

Utilize the PSCH 16p to perform slot synchronization. This is typically done with a matched filter (or similar device) that is matched to the PSCH 16p that is common to all base stations. Slot timing is obtained from peaks in the matched filter output.

Step 2: Frame synchronization and code group identification.

The slot timing obtained in step 1 is used to correlate the SSCH 16s with all possible SSCH code sequences. The maximum correlation identifies the code group of the CPICH 20. The SSCH 16s having the first SSCH code sequence identifies the start of a frame 12.

Step 3: Scrambling code identification.

Symbol-by-symbol correlation is performed on the CPICH 20 for all eight codes within the code group identified in step 2. The maximum correlation value identifies the primary scrambling code of the base station.

Please refer to FIG. 4. FIG. 4 is a simple block diagram that illustrates cell synchronization for a prior art UE 30. Of course, the UE 30 will contain many more components than those shown in FIG. 4, which is restricted to the present discussion. The UE 30 includes a transceiver 39 and a synchronization stage 38. The transceiver 39 receives broadcasts from a base station (not shown) and passes broadcast data to the synchronization stage 38 in a manner familiar to those in the art of wireless devices. The synchronization stage 38 includes a stage 1 31, a stage 2 32 and a stage 3 33. The stage 1 31 performs the slot synchronization of step 1 discussed above. Results from stage 1 31 are passed to stage 2 32, which performs the frame 12 synchronization and code group identification of step 2. Results from stage 2 32 are then passed on to stage 3 33, which performs the scrambling code identification of step 3. Stage 1 31 includes a peak profiler 34. The peak profiler 34 contains the primary synchronization code 35 that is common to all base stations, and generates peak profile data 36 that is obtained by matching the primary synchronization code 35 against the PSCH 16p received from the transceiver 39. The profile data 36 holds data for a predetermined number of chips, and as the PSCH 16p repeats with every slot 14, it is common to hold enough data to cover an entire slot 14, i.e., 2560 chips. The chip in the profile data 36 having the highest peak profile is assumed to mark the PSCH 16p, and is thus used as the PSCH path position 37. This is illustrated in FIG. 5, which is an example graph of peak profile data 36 (not to scale). Stage 1 31 notes that in the profile data 36 a maximum valued peak occurs at chip number 1658. The PSCH path position 37 would thus hold a value indicative of the peak path position at chip 1658. The PSCH path position 37 is forwarded to stage 2 32 as the slot 14 synchronization point. Utilizing the slot 14 position marked by the PSCH path position 37, stage 2 32 performs step 2 outlined above to generate a code group value 32g. Stage 2 32 will also generate a slot number 32s, which indicates the number of the slot 14 in its respective frame 12 that was marked by the PSCH path position 37. As there are fifteen slots 14 in a frame 12, the slot number 32s could be a value that runs, for example, between zero and fourteen. In this manner, frame 12 synchronization is performed. Finally, the results from stage 2 32 are passed on to stage 3 33, which subsequently performs step 3 to generate a primary scrambling code 33p for the CPICH 20. A verification stage 38v can be used to verify the results obtained from stage 3 33, and typically involves a process similar to that performed in stage 3 33, but with stricter correlation parameters that are performed over more frames 12.

Typically, two types of cell searching is done: an initial cell search when the UE 30 is first turned on, and a target cell search when the UE 30 is attempting to identify local base stations. In an initial cell search, the UE 30 attempts to find a base station having the best reception, and thus will choose the maximum peak present in the profile data 36. However, in a target cell search, successively smaller peaks are checked, passing through stage 1 31, stage 2 32 and stage 3 33 to obtain the corresponding primary scrambling codes of these other base stations. This process is both time consuming and power intensive. In a target cell search, the prior art synchronization stage 38 will examine the "n" highest peaks in the profile data 36. For example, the six highest peaks may be checked, and respectively run through the synchronization stage 38. A drawback to this, though, is that multi-path components are also found. For example, in FIG. 5, the peak a chip number 1661 may be a multi-path component of the peak at path position 1658. Running a multi-path component through the three stages of the synchronization stage 38 consumes both time and battery power.

SUMMARY OF INVENTION

It is therefore a primary objective of this invention to provide a method and related device for performing efficient cell searching that finds multi-path components in a power-efficient manner.

Briefly summarized, the preferred embodiment of the present invention discloses a method and related wireless device for performing a cell search procedure. The wireless device includes a peak profiler that is capable of generating a peak profile of a primary synchronization channel (PSCH), and a synchronization stage for performing code group identification and scrambling code identification. The peak profiler is used to generate a peak profile of the PSCH against a predetermined primary synchronization code. A group of one or more peaks in the peak profile are selected, each peak having a corresponding path position. A first peak from the group of peaks is chosen. The first peak has a first path position and an unknown associated code group number. The synchronization stage is handed the first path position to obtain a first code group number associated with the first peak and a first code number associated with the first peak. A multi-path search window is then opened in the peak profile around the first path position. A second peak within the multi-path search window is selected, and a verification procedure is performed on this second peak to determine if the second peak has a code number that is identical to the first code number. The first code group number is assigned to the second peak if the verification procedure determines that the code number of the second peak is identical to the first code number.

It is an advantage of the present invention that by performing a verification procedure on the second peak it is possible to learn in a relatively quick and power efficient way whether or not the second peak is a multi-path component of the first peak. This permits a quick determination of multi-path components, and thus eliminates these multi-path components from the cell searching process.

These and other objectives of the present invention will no doubt become obvious to those of ordinary skill in the art after reading the following detailed description of the preferred embodiment, which is illustrated in the various figures and drawings.

DETAILED DESCRIPTION

Figure 1:
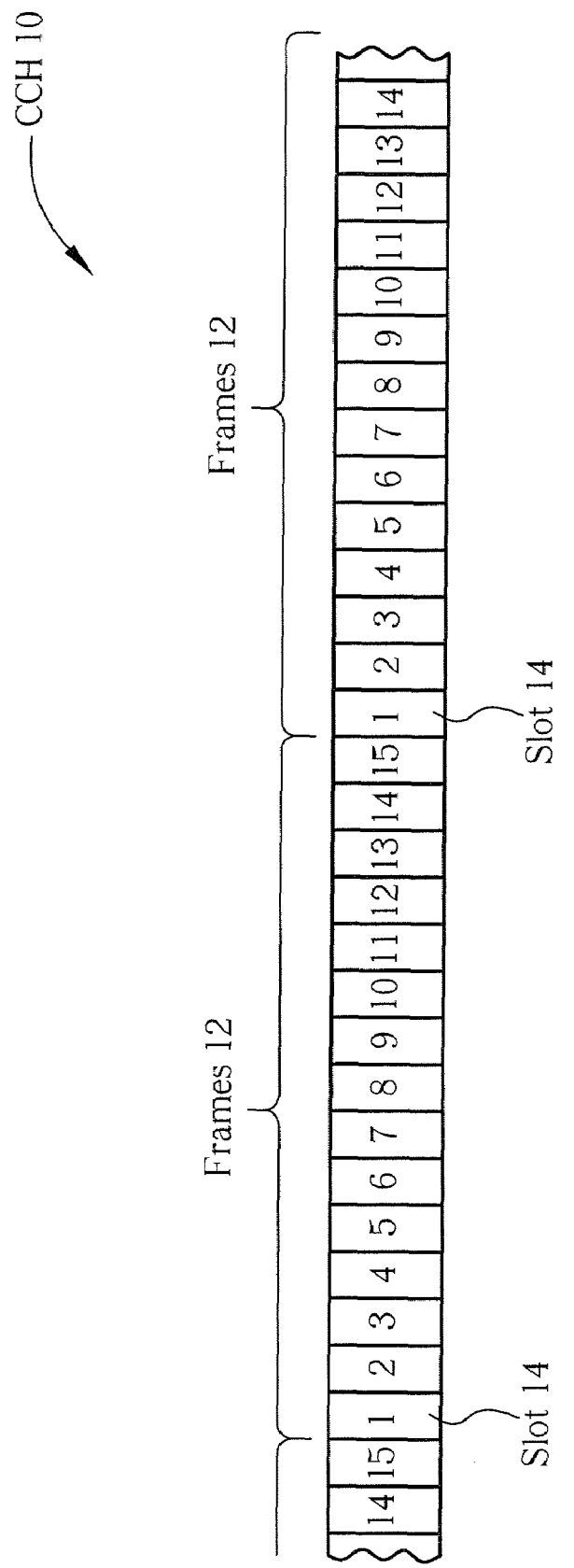
FIG. 1 is a block diagram of a downlink Common Control Channel (CCH) in a DS/CDMA system.
Figure 2:
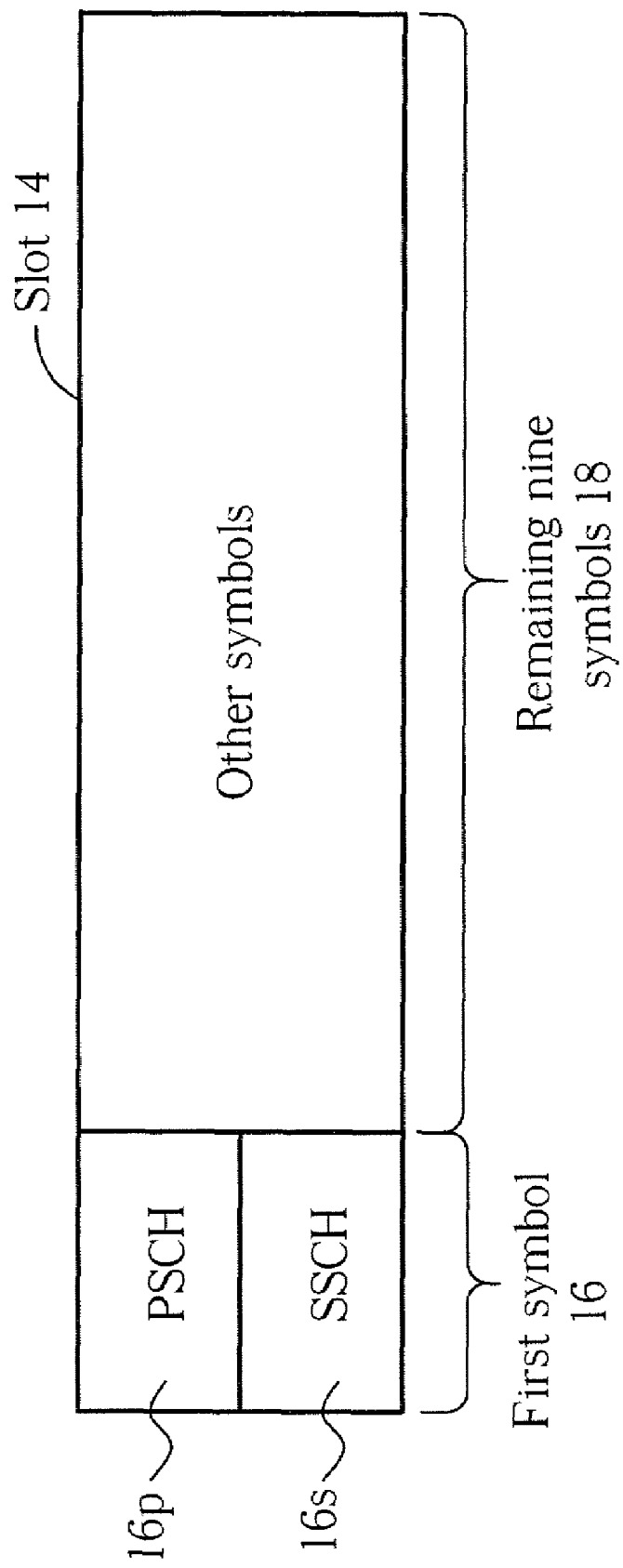
FIG. 2 is a block diagram of a slot 14 depicted in the CCH of FIG. 1.
Figure 3:
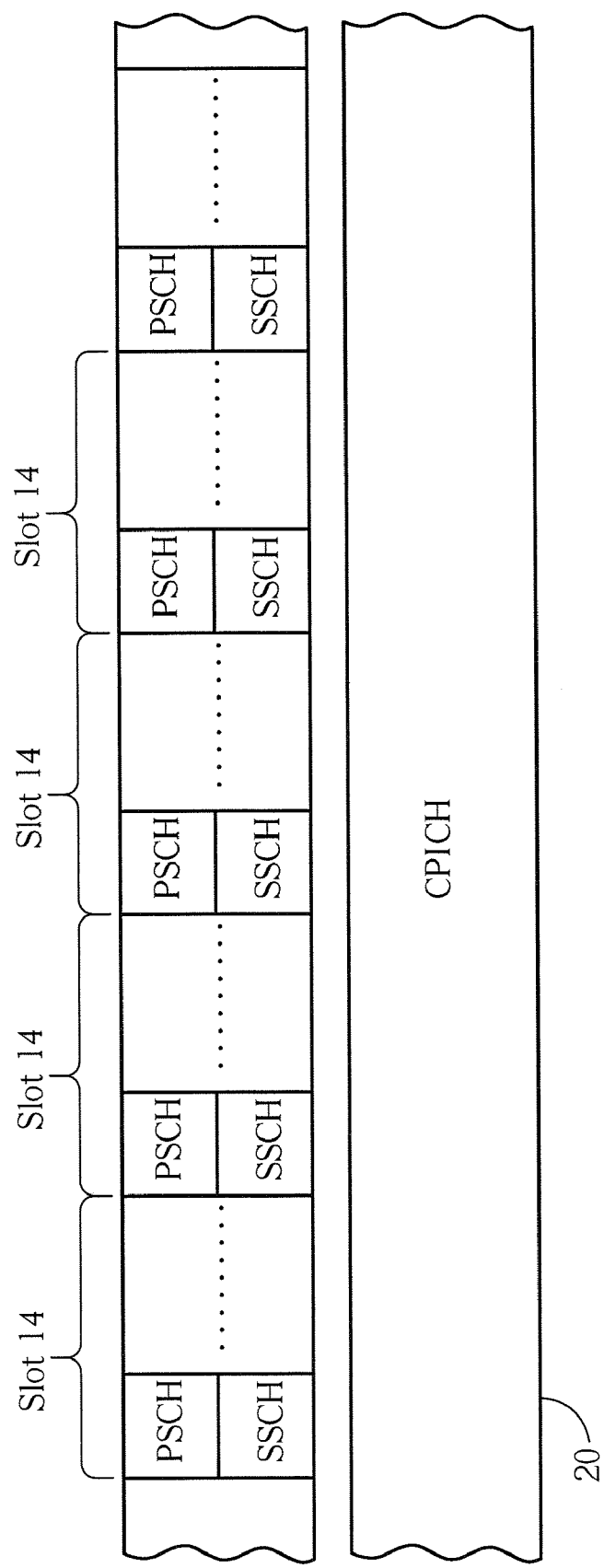
FIG. 3 is a block diagram of a common pilot channel (CPICH) broadcast with the CCH 10 of FIG. 1.
Figure 4:
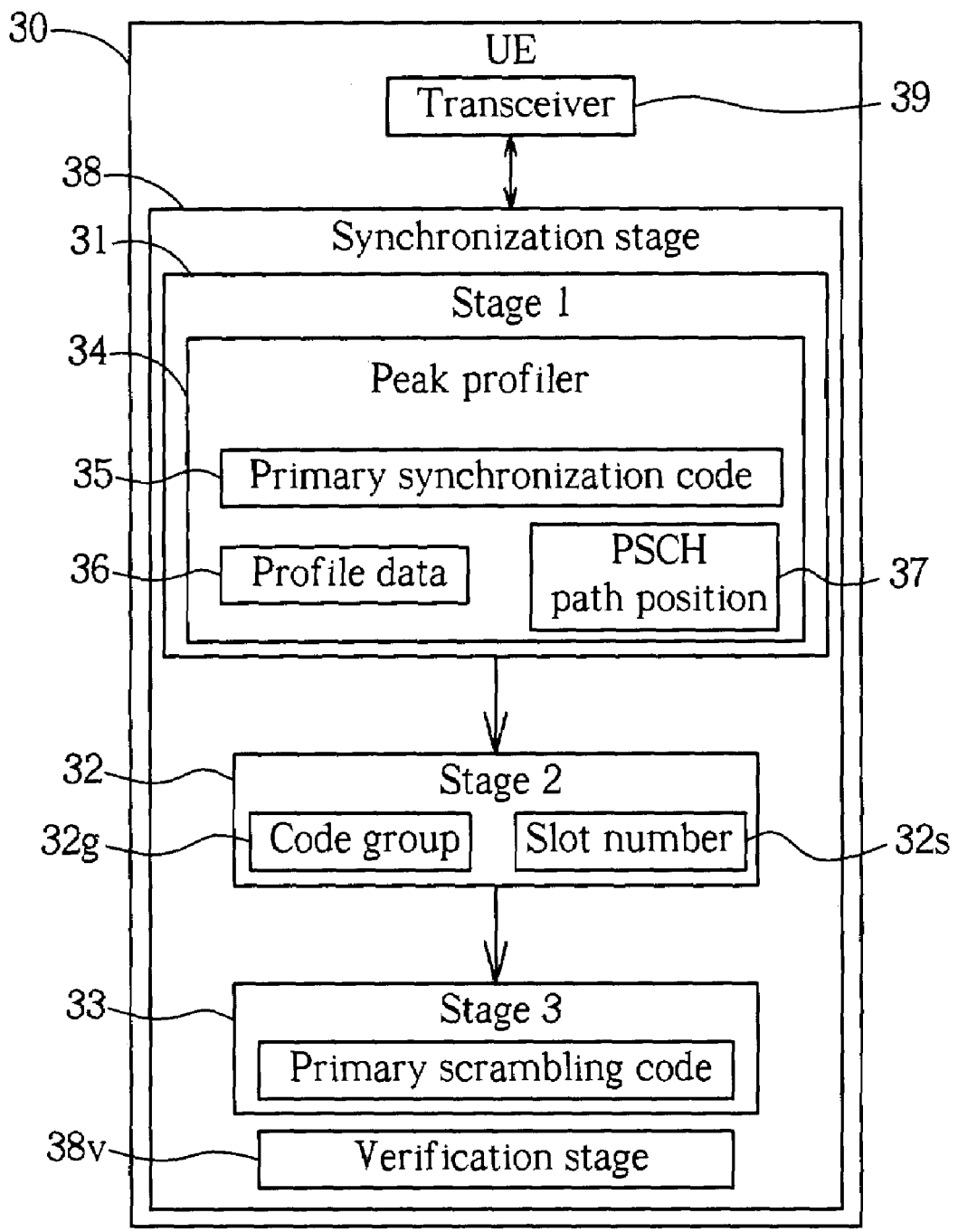
FIG. 4 is a simple block diagram that illustrates cell synchronization for a prior art user equipment (UE).
Figure 5:
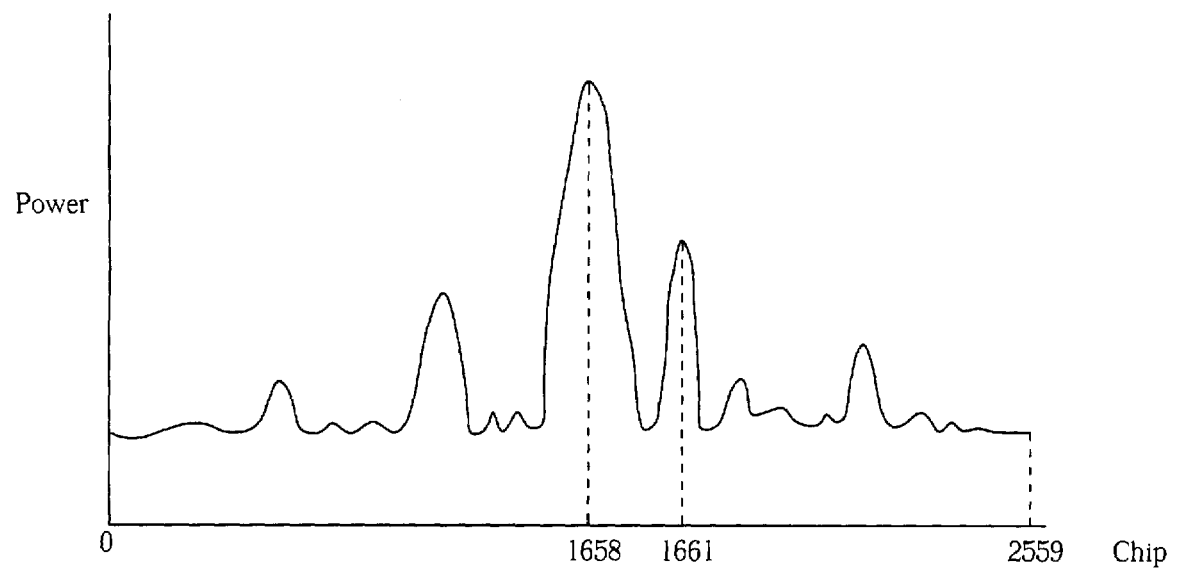
FIG. 5 is an example graph of peak profile data 36 indicated in FIG. 4.
Figure 6:
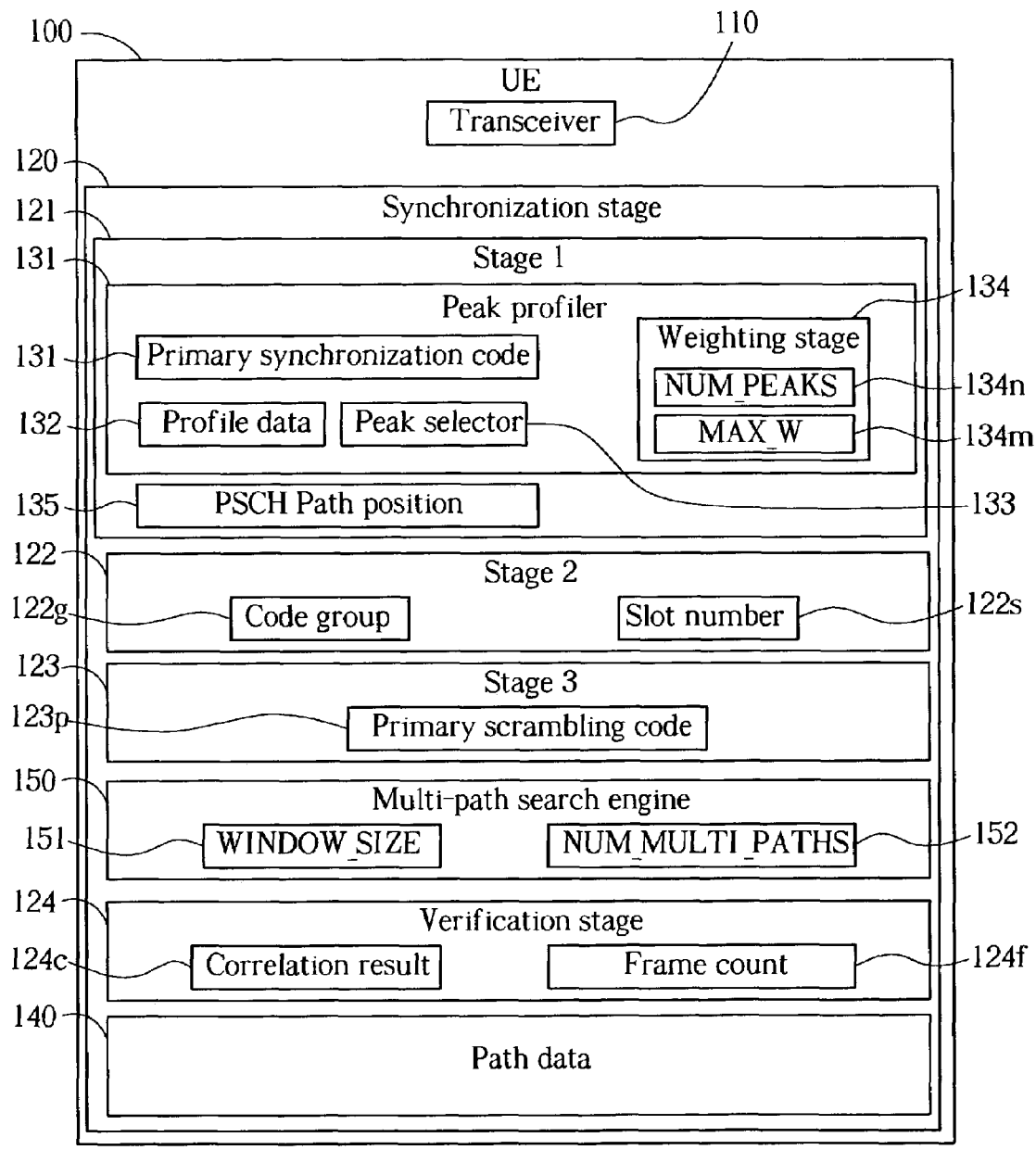
FIG. 6 is a simple block diagram of a UE according to the present invention.

Please refer to FIG. 6. FIG. 6 is a simple block diagram of a UE 100 according to the present invention. Although not shown in FIG. 6, the various stages in the UE 100 may be implemented by way of a central processing unit (CPU) executing the appropriate program code to perform the method of the present invention, as detailed in the following. The arrangement of a CPU with program code to perform cell search procedures is well known in the art, and coding the present invention method should be well within the means of one reasonably skilled in the art after reading the following detailed description of the preferred embodiment. Alternatively, dedicated hardware may be used to implement some or all portions of the present invention method. Further, it should be understood that the various components and stages do not need to match the compartmental arrangement depicted in FIG. 6.

Much of the present invention UE 100 is similar to the prior art UE 30. In particular, the UE 100 includes a transceiver 110, a stage 2 122, and a stage 3 123 that are nearly equivalent to the prior art UE 30, but for functional additions noted in the following. The stage 2 122 utilizes a PSCH path position 135 obtained from the stage 1 121 to generate a code group number 122g, and a slot number 122s, as in the prior art. The stage 3 123 utilizes the results from the stage 2 122 to obtain a primary scrambling code 123p for the CPICH 20, also as in the prior art. The UE 100 also includes a verification stage 124 that is used to verify the primary scrambling code 123p result generated by the stage 3 123, as in the prior art. However, the control parameters for the verification stage 124, such as correlation results 124c or frame count 124f, may be adjusted for stricter or more lax requirements. The correlation results 124c would indicate how strongly the primary scrambling code 123p being validated must correlate with the CPICH 20. The frame count 124f would indicate for how many frames 12 this correlation must last to be considered valid. The UE 100 also includes a peak profiler 130 that generates profile data 132 as in the prior art by matching a primary synchronization code 131 against the PSCH 16p received from the transceiver 110. A peak selector 133 then selects a peak from the profile data 132 according to criteria explained below, and uses this peak as the PSCH path position 135 that is subsequently processed at the stage 2 122.

Figure 9:
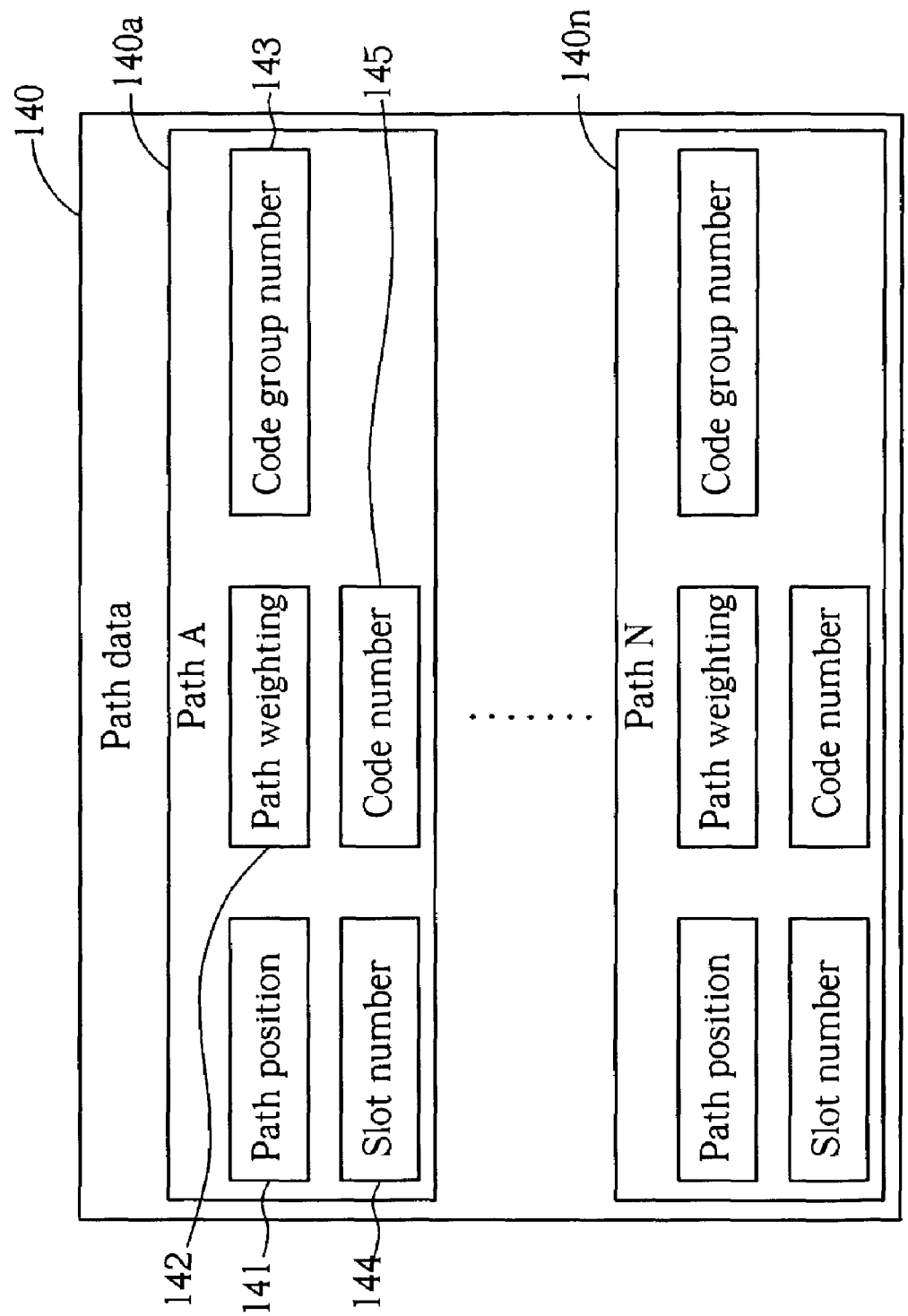
FIG. 9 is a block diagram of path data according to the present invention.

Please refer to FIG. 9. FIG. 9 is a block diagram of path data 140. The UE 100 manages a database of path data 140. The path data 140 includes one or more path entries 140a-140n. The number of entries 140a-140n held within the path data 140 is a design choice, may be fixed or variable depending upon the design implementation, but should be at least as large as a first predetermined value NUM_PEAKS 134n that is utilized by a weighting stage 134. As an extreme example, there may be a one-to-one correspondence between entries 140a-140n in the path data 140, and chips in the profile data 132. The profile data is typically just large enough to cover one complete slot 14, and thus would hold peak information for 2560 chips. There could thus be 2560 entries 140a-140n in the path data 140 for a one-to-one correspondence.

The data structure of each path entry 140a-140n includes a path position 141, a path weighting 142, a code group number 143, a slot number 144 and a scrambling code number 145. The values held in these data structures 141-145 may have the numerical ranges, and be obtained from one of the various stages, as shown below:

| Data structure | Range | From |
| --- | --- | --- |
| Path position | 0 to 2559 | Stage 1 |
| Path weighting | 0 to MAX_W | Stage 1 |
| Code group number | 0 to 63 | Stage 2 |
| Slot number | 0 to 14 | Stage 2 |
| Code number | 0 to 7 | Stage 3 |

As there are 2560 chips per slot 12, there are 2560 different possible path positions in the profile data 132, which may be numbered from zero to 2559. The path position 141 may be obtained from the PSCH path position 135 of stage 1 121, as selected by the peak selector 133. It is the job of the weighting stage 134 to generate the path weighting 142 of selected entries 140a-140n, the value of which may vary, for example, from zero to a second predefined value MAX_W 134m. This is explained later, and is performed in stage 1 121. As there are 64 possible code groups, the code group number 143 may run from zero to 63, and may be obtained from the code group 122g of stage 2 122. Each frame 12 has fifteen slots 14, and so these slots may be numbered from zero to 14. The slot number 144 may be obtained from the slot number 122s of stage 2 122, and indicates the slot number of the slot 14 within its respective frame 12 for the path position 141. Finally, each code group contains 8 codes, which may be numbered from zero to 7. The code number 145 may be obtained from the primary scrambling code 123p of stage 3 123.

Figure 7:
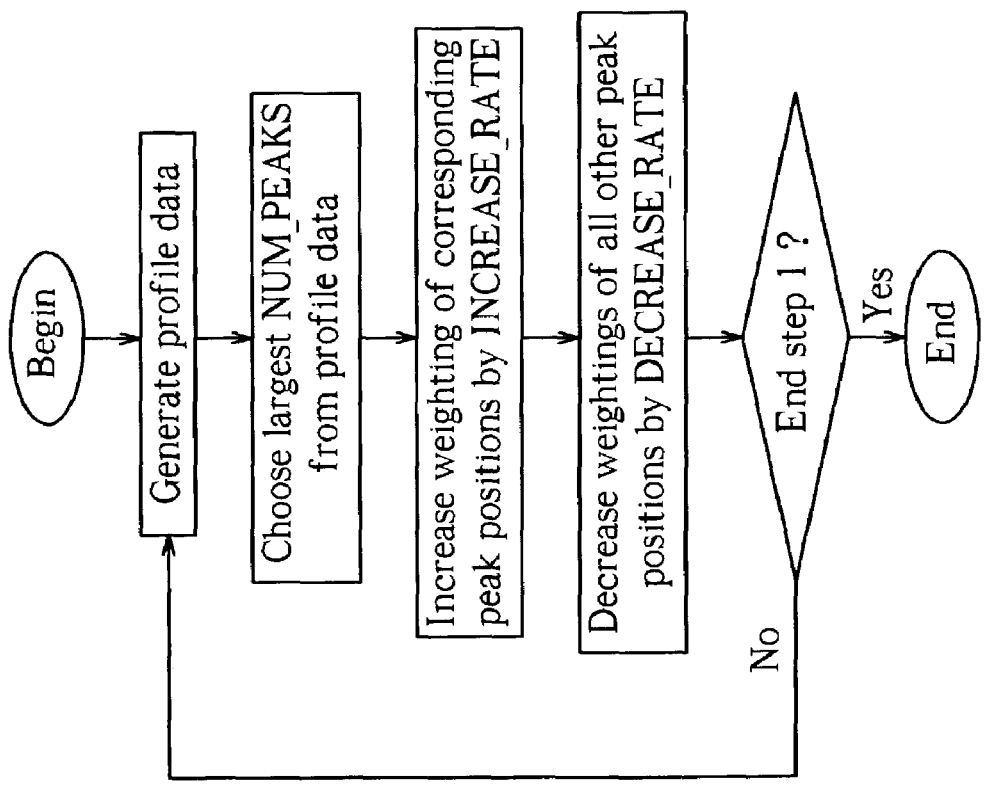
FIG. 7 is a flow chart for a stage 1 of the present invention
Figure 10:
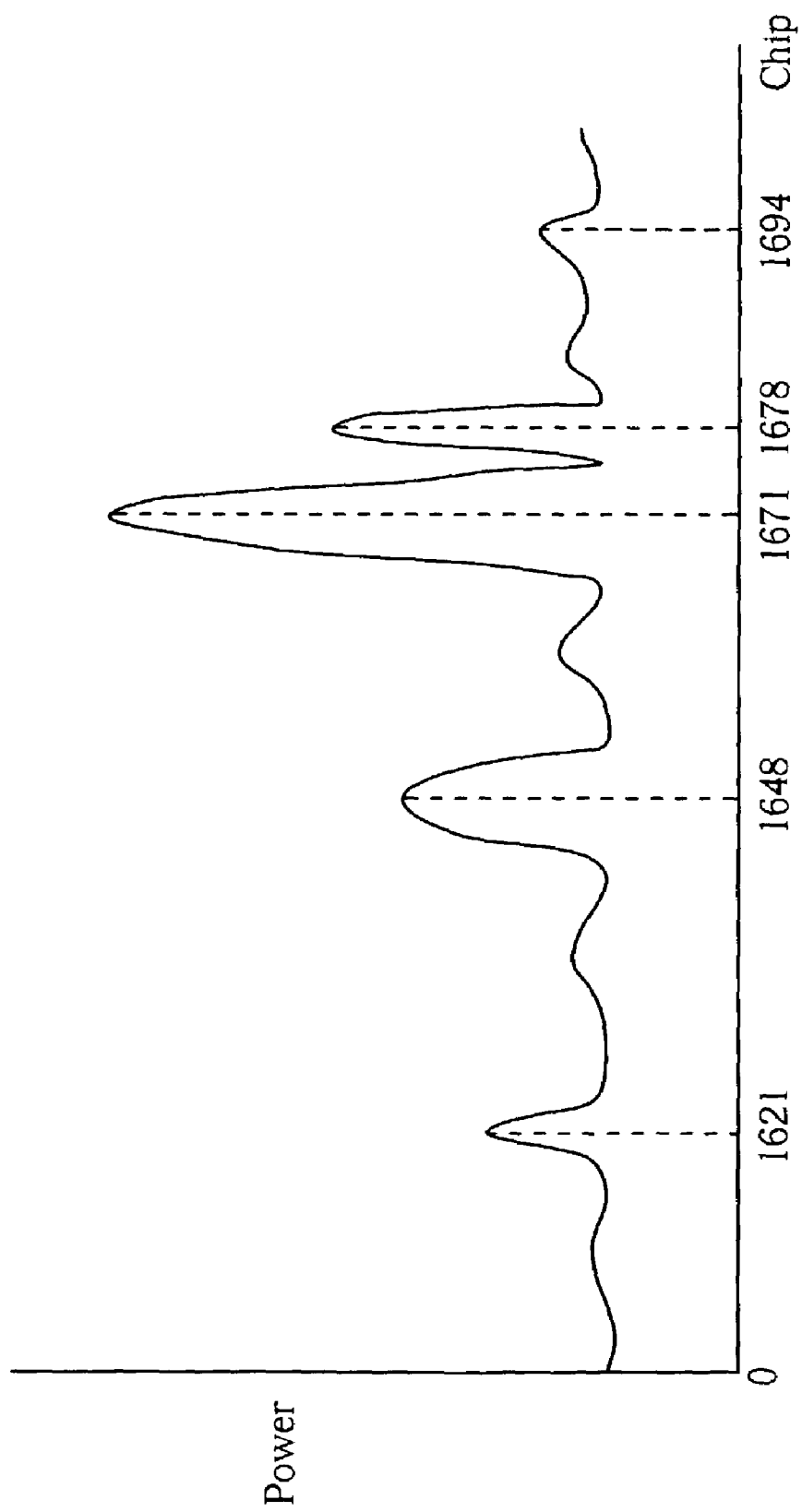
FIGS. 10 and 11 are example graphs of profile data.
Figure 11:
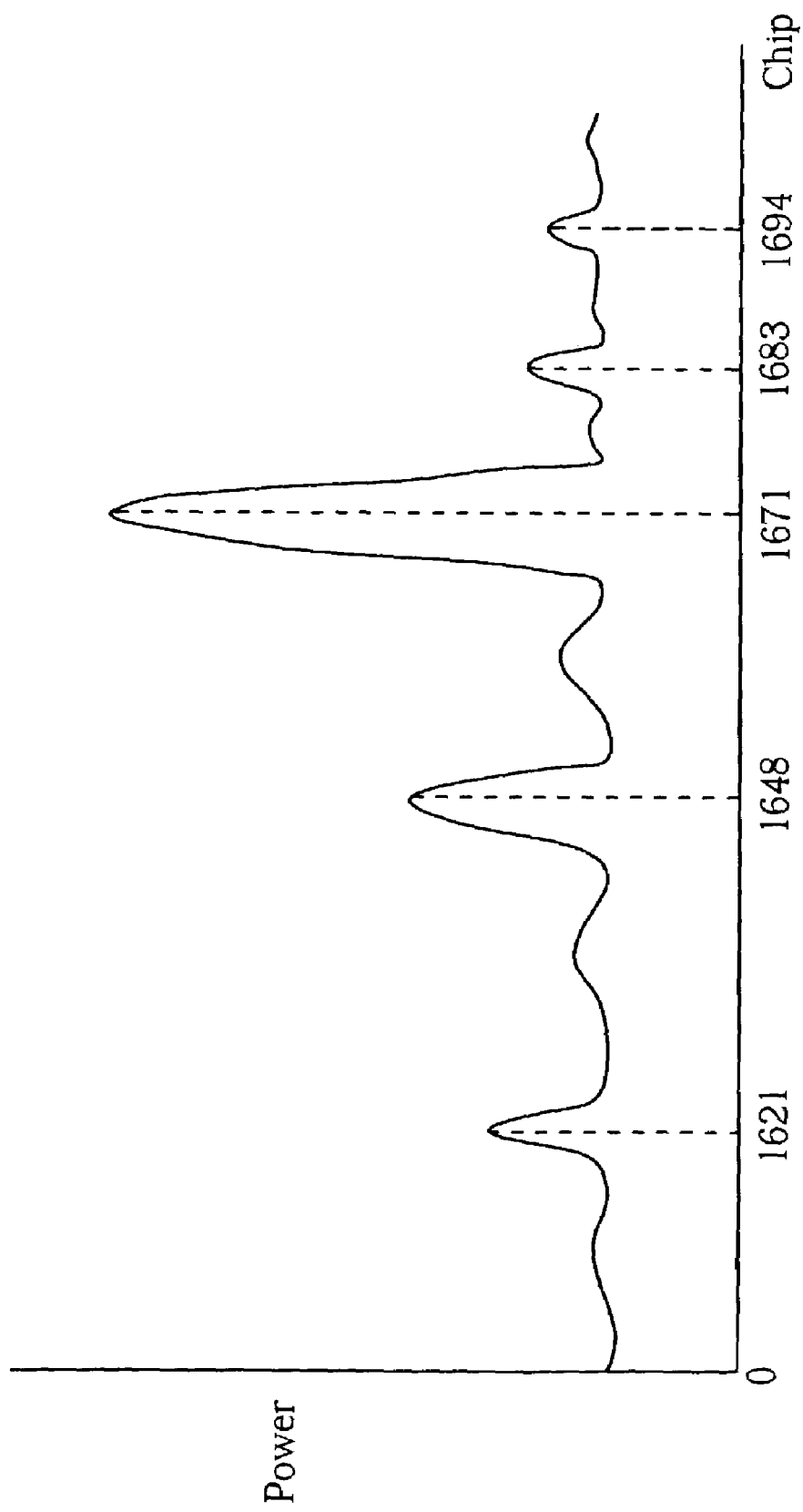

Please refer to FIG. 7. FIG. 7 is a flow chart for stage 1 121. The profile data 132 is updated with every new 2560 chips that stream in from the transceiver 110. Each time a new set of profile data 132 arrives, the weighting stage 134 performs a weighting procedure upon the profile data 132 to generate the path weightings 142 in the path data 140. With the current profile data 132, the weighting stage 134 may select the NUM_PEAKS 134n highest-valued peaks in the profile data 132. The corresponding path weighting 142 for each of these NUM_PEAKS 134n peaks is increased by INCREASE_R-ATE, for example by two. All other path weighting 142 values in the path data 140 are decreased by DECREASE_RATE, for example by one. Please refer to FIGS. 10 and 11 for an example of this weighting procedure performed by the weighting stage 134. FIGS. 10 and 11 are example graphs of profile data 132. Assume initially that the peak profiler 130 generates the profile data 132 depicted in FIG. 10. Further assume that NUM_PEAKS 134n is set to a value of five. The weighting stage 134 selects the five highest valued peaks from the profile data 132, which are at path positions 1621, 1648, 1671 1678 and 1694. Assume that at the time that the new profile data 132 arrives, the corresponding path data 140 for these selected peaks looks like:

| Position | Weighting | Code group |
| --- | --- | --- |
| 1621 | 0 | Unknown |
| 1648 | 0 | Unknown |
| 1671 | 0 | Unknown |
| 1678 | 0 | Unknown |
| 1694 | 0 | Unknown |

Other data structures in the path data 140 are ignored for this example. Each of the NUM_PEAKS 134n peaks has its corresponding path weighting 142 increased by two. All other path weightings 142 in the path data 140 are decreased by one, to a minimum of zero. The above path data 140 would thus become:

| Position | Weighting | Code group |
| --- | --- | --- |
| 1621 | 2 | Unknown |
| 1648 | 2 | Unknown |
| 1671 | 2 | Unknown |
| 1678 | 2 | Unknown |
| 1694 | 2 | Unknown |

These path data entries 140a-140n may be explicitly added by the weighting stage 134, or be already present and simply modified by the weighting stage 134. A bit later, new profile data 132 is generated by the peak profiler 130, as shown in FIG. 11. The MAX_PEAKS 134n peaks in the new current profile data 132 are at path positions given by 1621, 1648, 1671, 1683 and 1694. The weights 142 for these peaks are increased by two, and all other weights 142 are decreased, giving the following path data 140:

| Position | Weighting | Code group |
| --- | --- | --- |
| 1621 | 4 | Unknown |
| 1648 | 4 | Unknown |
| 1671 | 4 | Unknown |
| 1678 | 1 | Unknown |
| 1683 | 2 | Unknown |
| 1694 | 4 | Unknown |

In particular, as the path position 1678 that was first present in FIG. 10 was not selected in FIG. 11, its corresponding path weighting 142 is decreased by one to a value of one. Path positions 1621, 1648, 1671 and 1694, being present and selected in both FIG. 10 and FIG. 11, are assigned corresponding path weightings of 2+2, or four.

Note that as the code group numbers 143 are unknown, the scrambling code numbers 145 are also necessarily unknown. Advance knowledge of the scrambling code used by the CPICH 20 implicitly gives the code group of the CPICH 20, as each scrambling code is a member of only one code group. That is, if for whatever reason the primary scrambling code used for the CPICH 20 is given or known, then the associated code group for the CPICH 20 is also known, and does not need to be explicitly calculated by the stage 2 122. It is thus assumed in all of the following that if a scrambling code is known, then the associated code group is also known. This is particularly true for the peak detector 133.

The peak detector 133 selects as the PSCH path position 135 the path position 141 of a path entry 140a-140n from the path data 140 that has the highest path weighting 142, and which has an unknown code group number 143. Path weighting ties may be resolved, for example, by then choosing the highest valued peak. By selecting peaks with unknown code group numbers 143, it is ensured that the stage 2 122 works only on those peaks in the profile data 132 whose corresponding code numbers 145 have not yet been determined. Note that the stage 1 121 is continuously performing the path weighting procedure, so that even as stage 2 122 and stage 3 123 are processing, the path weightings 142 may be changing. No path weighting 142 is permitted to exceed MAX_W 134m, which may be fixed in advance, or changed on the fly as conditions or specific implementations require. The stage 1 121 may stop processing the profile data 132 when instructed by an upper layer (not shown) within the UE 100.

Figure 8:
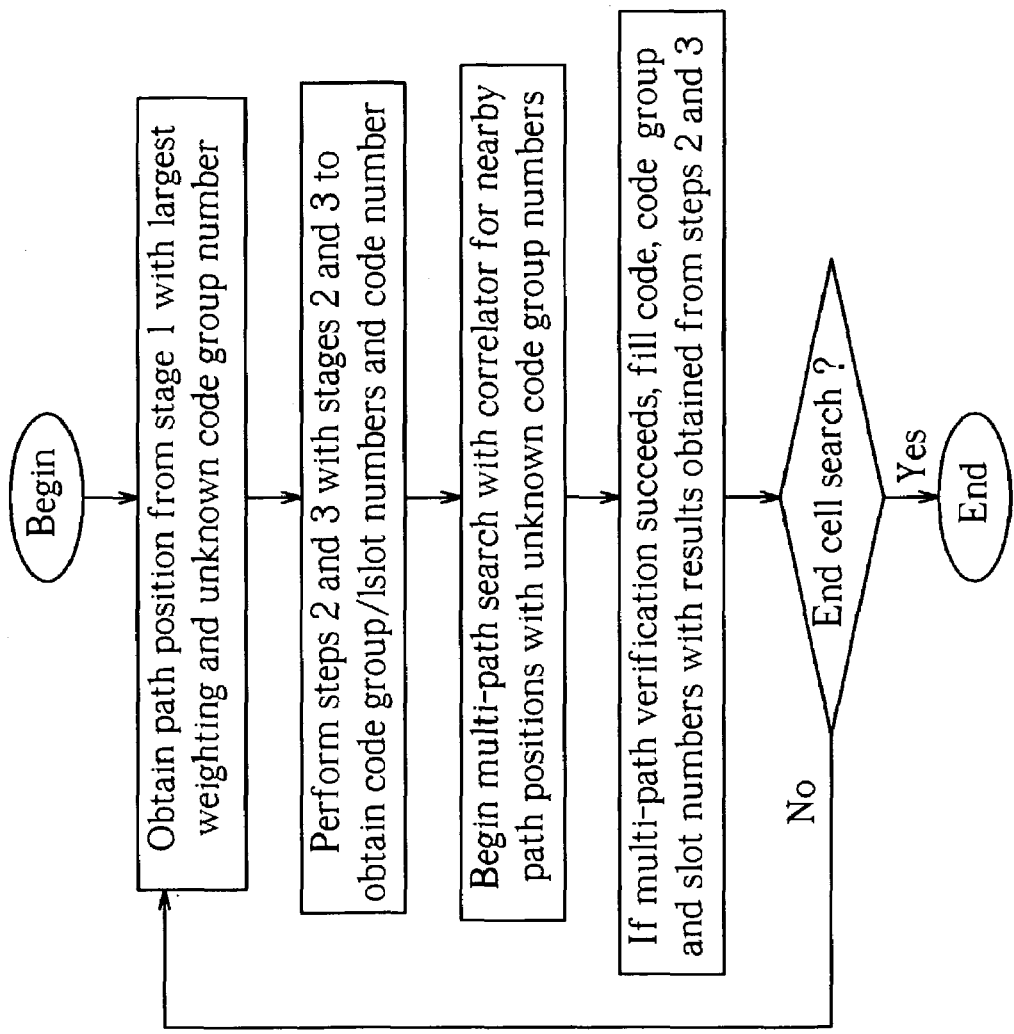
FIG. 8 is a flow chart for cell searching according to the present invention method.

Please refer to FIG. 8. FIG. 8 is a flow chart for cell searching according to the present invention method. The stage 2 122 utilizes the PSCH path position 135 and generates a corresponding code group 122g result, and slot number 122s result. The stage 2 122 fills the code group number 143 of the path entry 140a-140n that corresponds to the PSCH path position 135 with the code group 122g result, and the slot number 144 with the slot number 122s result. At this point, for the entry 140a-140n corresponding to the PSCH path position 135, the code group number 143 is known, but the code number 145 is still unknown. Hence, the results from stage 2 122 are forwarded to stage 3 123, which generates a primary scrambling code 123p result that is used to fill the corresponding code number 145 data structure for the entry 140a-140n.

Figure 12:
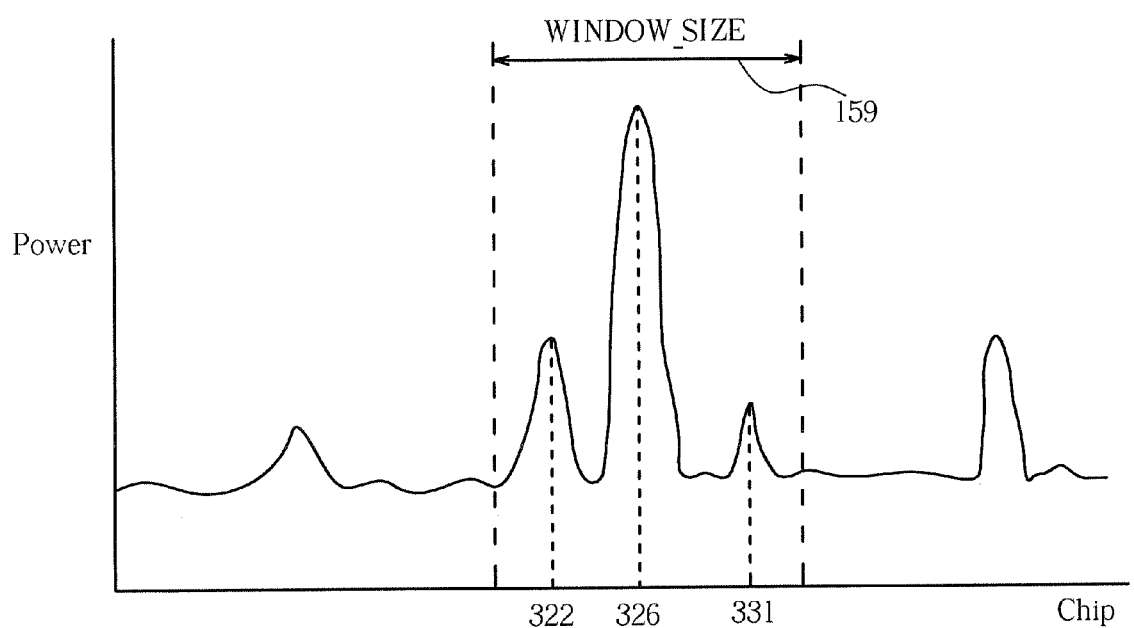
FIG. 12 is an example graph of a portion of profile data.

The verification stage 124 is used to verify the primary scrambling code 123p found in stage 3 123. This verification stage 124, however, may optionally be skipped. Finally, a multi-path search engine 150 performs a multi-path search procedure around the path position whose primary scrambling code 123p was found in stage 3 123. The multi-path search engine 150 opens a window within the profile data 132 that is centered around the PSCH path position 135 used to generate the primary scrambling code 123p, and which is WINDOW_SIZE 151 in width. (i.e., that spans WINDOW_SIZE 151 chips in the profile data 132). Within this multi-path search window, the multi-path search engine selects the NUM_MULTI_PATHS 152 highest peaks in the profile data 132 that have an unknown code group number 143 (i.e., and unknown code number 145), and utilizes the verification stage 124 to perform a verification procedure on these selected peaks to determine if these peaks correlate with the primary scrambling code 123p. Those peaks that are verified by the verification stage 124 have their corresponding code group numbers 143, slot numbers 144 and code numbers 145 set to equal those found for the primary scrambling code 123p. If necessary, entries 140a-140n can be created for those verified peaks. As an example of the above, please refer to FIG. 12. FIG. 12 is an example graph of a portion of profile data 132.

The peak selector 133 selects as the PSCH path position 135 a peak at path position 326. This PSCH path position 135 is then processed through stage 2 122 and stage 3 123. As a result, the path data 140 may have the following entries 140a-140n (path weightings 142 are ignored in this example):

| Position | Code group | Slot | Code |
|---|---|---|---|
| 322 | Unknown | Unknown | Unknown |
| 326 | 18 | 6 | 4 |
| 331 | Unknown | Unknown | Unknown |

After completion of stage 3, the multi-path search engine 150 opens a multi-path search window 159 around path position 326, which is WINDOW_SIZE 151 chips in width (for example, twelve chips wide), and which is centered around path position 326. Alternatively, the multi-path search window 159 may be positioned so that the PSCH path position 135 is set at the left of the multi-path search window 159, or perhaps even slightly outside if the multi-path search window 159. The WINDOW_SIZE 151 may be determined by an engineer reasonably skilled in the art of wireless communications, and should be sufficiently wide to catch most multi-path signals while being sufficiently narrow to avoid catching signals that are not due to multi-path interference.

The multi-path search engine 150 then selects NUM_MULTI_PATH 152 peaks in the multi-path search window 159 and utilizes the verification stage 124 to perform a verification process on these selected peaks. NUM_MULTI_PATH 152 may be a fixed value, or computed on the fly. The peaks may be selected according to their relative peak values, their associated path weightings 142 in the path data 140, or a combination of the two. All peaks selected for verification, however, should have unknown associated code group numbers 143 so that the verification process is not wasted upon a peak whose scrambling code number 145 is already known. The verification parameters 124c, 124f may be adjusted to meet the desired stringency for multi-path verification. In FIG. 12 the multi-path search engine 150 selects two peaks: a first at a path position of 322, and a second at a path position of 331. The verification stage 124 is then used to verify these peaks against the scrambling code number 145 found for the PSCH path position 135 (i.e., the path position of 326). Assuming that the peak at 322 fails the verification procedure performed by the verification stage 124, and that the peak at path position 331 passes the verification procedure, the path data 140 presented above would then be:

| Position | Code group | Slot | Code |
|---|---|---|---|
| 322 | Unknown | Unknown | Unknown |
| 326 | 18 | 6 | 4 |
| 331 | 18 | 6 | 4 |

Note that in the above, the multi-path search engine 150 sets the code group number 143, slot number 144 and scrambling code number 145 to match those found for the path position of 326, as the path position of 331 was verified by the verification stage 124 to have the same code number 145 as the peak at path position 326.

When performing an initial cell search procedure, the UE 100 is simply trying to find the best cell. In this case, the NUM_PEAKS value 134n can be set to one, so as to select only the single best peak from the profile data 132 while conserving power. On the other hand, when performing a target cell search, more than a single base station needs to be found. In this case, the NUM_PEAKS value 134*n* can be increased to a suitable value, such as five or six.

In contrast to the prior art, the present invention can find multi-path components using a correlator in the verification stage 124, whereas the prior art utilizes another matched filter to perform the multi-path analysis. Utilizing the correlator of the verification stage 124 reduces hardware complexity, while requiring less power than a matched filter. Additionally, by finding multi-path candidates before performing another cell search procedure, the present invention helps to avoid a next cell search procedure from finding a multi-path component from a previous cell search procedure. The present invention is thus capable of reducing the time required to perform a neighbor cell search procedure, and thus helps to reduce the power consumption of the UE.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for performing a cell search procedure in a wireless device, the wireless device comprising:
    a peak profiler capable of generating a peak profile of a primary synchronization channel (PSCH); and
    a synchronization stage for performing code group identification and scrambling code identification;
the method comprising:
    utilizing the peak profiler to generate a peak profile of the PSCH against a predetermined primary synchronization code;
    selecting a first peak from the peak profile, the first peak having a first path position and an unknown associated code group number;
    utilizing the synchronization stage and the first path position to obtain a first code group number associated with the first peak and a first code number associated with the first peak;
    opening a multi-path search window of a predetermined multi-path width in the peak profile according to the first path position;
    selecting a second peak within the multi-path search window;
    performing a verification procedure on the second peak to determine if the second peak has a code number that is identical to the first code number;
    associating the first code group number with the second peak if the verification procedure determines that the code number of the second peak is identical to the first code number; and
    establishing a network connection between the wireless device and a base station corresponding to a code number of the first peak or the second peak.

2. The method of claim 1 further comprising performing a weighting procedure upon a first predetermined number of peaks to assign a respective weight to each of the first predetermined number of peaks, the first predetermined number being greater than zero.

3. The method of claim 2 wherein the first peak has the highest weighting of all peaks having an unknown code group number.

4. The method of claim 2 wherein performing the weighting procedure comprises:
    repetitively obtaining a peak profile of a predetermined path width that at least spans a frame width of the PSCH; and
    increasing the weight of a peak in the first predetermined number of peaks in a current peak profile.

5. The method of claim 4 further comprising decreasing the weight of a peak not in the first predetermined number of peaks in the current peak profile.

6. The method of claim 5 wherein each path position in the peak profile has an associated weight, and for each obtained peak profile, the weights of the path positions corresponding to the first predetermined number of peaks in the current peak profile are increased, and weights of the path positions corresponding to peaks not in the first predetermined number of peaks in the current peak profile are decreased.

7. The method of claim 1 wherein the first peak is contained within the multi-path search window.

8. The method of claim 7 wherein the multi-path search window is centered around the first peak.

9. The method of claim 1 wherein the synchronization stage is further capable of performing frame synchronization, and a first slot number is also obtained for the first peak by the synchronization stage.

10. The method of claim 9 farther comprising assigning the first slot number to the second peak if the verification procedure determines that the code number of the second peak is identical to the first code number.

11. The method of claim 1 wherein when performing an initial cell search, the first predetermined number is one.

12. The method of claim 1 wherein when performing a target cell search, the first predetermined number is greater than one.

13. A wireless device for implementing the method of claim 1.

14. A method for performing a cell search procedure in a wireless device, the wireless device comprising:
    a peak profiler capable of generating a peak profile of a primary synchronization channel (PSCH); and
    a synchronization stage for performing code group identification and scrambling code identification;
the method comprising:
    utilizing the peak profiler to repetitively obtain a peak profile of a predetermined path width of the PSCH against a predetermined primary synchronization code, the predetermined path width at least spanning a frame width of the PSCH;
    respectively increasing associated weights of path positions associated with a first predetermined number of peaks for each peak profile obtained from the peak profiler;
    selecting a first peak in a current peak profile, the first peak having an associated first path position and an unknown associated code group number, the first path position having an associated first weight, wherein the first weight exceeds the associated weights of all other peaks in the current peak profile that have unknown associated code group numbers;
    utilizing the synchronization stage and the first path position to assign a first code group number to the first peak and a first code number to the first peak;
    opening a multi-path search window of a predetermined multi-path width in the current peak profile according to the first path position;
    selecting a second peak within the multi-path search window;
    performing a verification procedure on the second peak to determine if the second peak has a code number that is identical to the first code number; and
    assigning the first code group number and first code number to the second peak if the verification procedure determines that the code number of the second peak is identical to the first code number; and establishing a network connection between the wireless device and a base station corresponding to the first code number of the first peak.

15. The method of claim 14 wherein the first peak is contained within the multi-path search window.

16. The method of claim 15 wherein the multi-path search window is centered around the first peak.

17. The method of claim 14 further comprising respectively decreasing the weight of a path position associated with a peak that is not in the first predetermined number of peaks for each peak profile obtained from the peak profiler.

18. The method of claim 14 wherein the synchronization stage is further capable of performing frame synchronization, and a first slot number is also obtained for the first peak by the synchronization stage.

19. The method of claim 14 wherein when performing an initial cell search, the first predetermined number is one.

20. The method of claim 14 wherein when performing a target cell search, the first predetermined number is greater than one.

21. A wireless device for implementing the method of claim 14.

22. A wireless device comprising:

a peak profiler capable of generating a peak profile of a primary synchronization channel (PSCH) against a predetermined primary synchronization code;

a peak selector for selecting a first peak from a first predetermined number of peaks in a peak profile obtained from the peak profiler, wherein the first predetermined number is greater than zero, the first peak has an unknown associated code group number, and the first peak has a first path position in the peak profile;

a synchronization stage for performing code group identification and scrambling code identification according to the first path position to generate an associated first code group number and a first code number; and a multi-path search engine for searching in a multi-path search window, the multi-path search window of a predetermined multi-path width in the peak profile at a path position determined by the first path position, the multi-path search engine selecting a second path position associated with a second peak within the multi-path search window, performing a verification procedure on the second path position to determine if the second peak has a code number that is identical to the first code number, and associating the first code group number with the second peak if the verification procedure determines that the code number of the second peak is identical to the first code number.

23. The wireless device of claim 22 further comprising a weighting stage for performing a weighting procedure upon the first predetermined number of peaks to assign a respective weight to each of the first predetermined number of peaks.

24. The wireless device of claim 23 wherein the peak selector selects a peak having the highest weighting of all peaks having an unknown code group number.

25. The wireless device of claim 24 wherein the weighting stage performs the following steps:

repetitively obtaining a peak profile of a predetermined path width that at least spans a frame width of the PSCH; and increasing the weight of a peak in the first predetermined number of peaks in a current peak profile.

26. The wireless device of claim 25 wherein the weighting stage further decreases the weight of a peak not in the first predetermined number of peaks in the current peak profile.

27. The wireless device of claim 26 wherein the weighting stage assigns an associated weight to each path position in the peak profile, and for each obtained peak profile, the weights of the path positions corresponding to the first predetermined number of peaks in the current peak profile are increased, and weights of the path positions corresponding to peaks not in the first predetermined number of peaks in the current peak profile are decreased.

28. The wireless device claim 22 wherein the first peak is contained within the multi-path search window.

29. The wireless device of claim 28 wherein the multi-path search window is centered around the first peak.

30. The wireless device of claim 22 wherein the synchronization stage is further capable of performing frame synchronization, and the synchronization stage obtains a first slot number for the first peak.

31. The wireless device of claim 30 further wherein the multi-path search engine further assigns the first slot number to the second peak if the verification procedure determines that the code number of the second peak is identical to the first code number.

32. The wireless device of claim 22 wherein when performing an initial cell search, the first predetermined number is one.

33. The wireless device of claim 22 wherein when performing a target cell search, the first predetermined number is greater than one.

* * * * *